2,940,947

METHOD OF INCORPORATING SILICONE OIL COATED SILICA INTO FLUORINATED POLYMERS

Thomas H. Welch, Eggertsville, N.Y., and Ralph F. Wolf, Akron, Ohio, assignors to Columbia-Southern Chemical Corporation No Drawing. Filed Nov. 25, 1957, Ser. No. 698,344

2 Claims. (Cl. 260—29.1)

This invention relates to novel organic fluorochemical compositions plasticized with silicone oil and to the method of preparing these compositions.

It is well known that fluorochemical or fluorocarbon polymers have exceptional oil resistance properties, are stable over an extremely wide temperature range and are inert. These characteristics are not found in combination in any other polymers. The organic fluorochemical compositions contemplated herein, such as fluorocarbon elastomers, manifest a remarkable resistance to solvents and to corrosive chemicals. As a consequence of such very desirable physical and chemical qualities, these compositions have potentially a wide field of use. Unfortunately, however, their utility is narrowed in many respects because of their unusual hardness and poor tensile strength.

Heretofore, attempts to add softeners, such as organic softeners which are generally used in other synthetic compositions and plastics, to the fluorochemical polymers herein contemplated have been unsuccessful because of the incompatibility of such softeners with these fluorine-containing compositions.

For example, attempts to admix silicone oils with fluorocarbon polymers to improve the tensile strength thereof have not been satisfactory since it is very difficult to retain the oils therein. It has been found that these oils bleed out of the fluorochemical compositions, thus negating their softening effect.

According to the present invention, however, fluorochemical compositions having greatly improved tensile strength and reduced hardness have been produced and a novel method of preparing such compositions has been provided. It has been found in accordance with the instant discovery that a softener or plasticizer, such as silicone oil, may be incorporated into fluorochemical polymers and retained therein if the softener is introduced in the presence of a finely-divided, hydrated siliceous pigment having an average ultimate particle size below 0.1 micron.

An especially desirable siliceous pigment for the instant discovery is prepared by acid precipitaion of an aqueous alkali metal silicate under carefully controlled conditions. The resulting silica generally contains at least 90 to 95 percent by weight $SiO_2$ on an anhydrous basis, i.e., free of "bound water" and "free water." The term "free water" denotes water which may be removed from the silica by heating it at a temperature of 105° C. for a period of 24 hours in a laboratory oven. The term "bound water" is intended to mean the amount of water which is driven off a siliceous pigment by heating the pigment at ignition temperature, for example, 1000° C. to 1200° C., until no further water can be removed, minus the amount of "free water" in the pigment.

Silica of the type contemplated herein generally is pulverulent and has a surface area of 25 to 300 square meters per gram, preferably 50 to 250 square meters per gram. The surface area of the silica may be measured by the Brunauer-Emmett-Teller method described in the Journal of the American Chemical Society, vol. 60, page 309 (1938).

The silica particles are in the form of flocs of loosely agglomerated particles. Thus, while the ultimate particle size of the precipitated silica as observed by the electron microscope is in the range 0.015 to 0.05 micron, the actual particle size is larger, usually ranging from 0.1 to 10 micron.

Silica of the type contemplated herein which generally contains at least 90 to 95 percent by weight $SiO_2$ on an anhydrous basis may also contain other components, such as metallic components. The pH of this silica rarely is above 9 to 9.5 and may be as low as 1.5 to 2.

It has been found according to the present discovery that fluorochemical polymers, such as fluorocarbon polymers, containing silica of the type hereinabove described and a silicone oil have more than double the tensile strength of fluorocarbon polymers containing silica only and no silicone oil. Furthermore, the polymers are much softer.

Thus, it can be seen that the incompatibility previously existing between silicone oil and fluorochemical polymers has been very efficiently overcome by dint of the present invention and that novel and very useful polymeric compositions are made available.

While best results are achieved with silicone oil plasticizers, according to the instant discovery, among which are dimethyl silicone oil, diethyl silicone oil, phenyl methyl silicone oil, and the like, other plasticizers are contemplated herein, such as ester-type plasticizers, chlorinated naphthalenes, chlorinated diphenyls, and the like. Of the ester-type plasticizers, tricresyl and triphenyl phosphates, dibutyl and diethyl phthalates are typical.

A wide variety of silicone oils known to the art may be used to coat the siliceous pigment. It is known that numerous silicone oils may be prepared having divergent physical and chemical properties. For example, by modifying the concentration and kind of reactants employed, by varying the reaction conditions and the like, it is possible to procure silicone oils having specific viscosities, stabilities, densities, etc. Silicone oils particularly suitable for the instant invention have the general formula:

where R is a saturated or unsaturated aliphatic or cycloaliphatic hydrocarbon radical, such as methyl, ethyl, propyl, vinyl, allyl, cyclohexenyl, and the like, or a substituated or unsubstituted aryl radical, such as phenyl, tolyl, and the like, or a mixture of aliphatic, cycloaliphatic and aryl radicals. The ratio of R:Si is approximately 2.

A silicone oil may contain small amounts of trifunctional siloxanes ($RSiO_3$), if these are properly compensated for by suitable quantities of monofunctional siloxanes ($R_3SiO$). The molecular weight of the oil may range from moderately low to very high. For example, $x$ in the above general formula may be from 1 to 10,000 or more. A particularly suitable oil results when $x$ is 7 or higher. The lower limit for $x$ is determined by the volatility which is permissible in a particular application. It should be pointed out that silicone polymers where $x$ is 10,000 or more are still liquid, soluble materials. In the case of extremely viscous materials, they may be applied to the siliceous pigment from solvent solution.

It is advantageous to treat the siliceous pigment with the silicone oil prior to compounding it with the fluorochemical polymer. Although this treatment may be effected in a number of ways, a convenient method consists in preparing a slurry or paste of a finely-divided siliceous pigment of the type contemplated herein using water or an organic solvent, such as toluene, as a medium and introducing into the resulting slurry a predetermined amount of plasticizer.

Another suitable method consists in adding a relatively small amount of siliceous pigment to a relatively large portion of silicone oil to produce a mixture containing 20 percent or more of the silicone oil by weight of the total mixture. This highly concentrated mixture may be blended by tumbling or by other means with uncoated siliceous pigment to yield a blend containing lower than 20 percent by weight silicone oil.

Just what type of reaction takes place upon incorporating a silicone oil into the fluorochemical polymers contemplated herein in the presence of a finely-divided, hydrated silica is not understood. However, it is known for certain that an interaction takes place among these constituents whereby the tensile strength of the resulting fluorochemical polymer is more than doubled and a very significant softening effect or reduction of hardness takes place.

According to the present invention a wide variety of fluorochemical polymers may be employed. Typical of these fluorine-containing polymers are solid rubber-like homopolymers and copolymers of unsaturated fluorocarbons containing the polymerizable

group, such as vinyl fluoride, vinylidene fluoride, and chlorine-substituted derivatives thereof, with or without other polymerizable unsaturated materials containing the group

such as butadiene, acrylonitrile, styrene, and the like.

Generally, the fluorochemical compositions contemplated herein are solid, linear polymers of a compound containing at least one F atom and a polymerizable

group, the F atom being attached directly to a C atom in the compound, said polymers being characterized by the fact that they manifest poor tensile strengths and unusual hardness. In other words, among the fluorochemical compositions contemplated herein are solid, linear polymers of fluorinated organic compounds containing at least one —$CF_x$ group, where $x$ is a value from 1 to 3, the polymers thus having recurring groups of the structure —$CF_x$ in the polymer chain. These fluorinated organic monomeric compounds, as will be seen hereinafter, may be homopolymerized or copolymerized with other fluoro-substituted compounds or other organic compounds containing the polymerizable

group.

Chlorotrifluoroethylene and tetrafluoroethylene are typical, when homopolymerized, of polymers contemplated herein manifesting resistance to high temperatures and to chemical attack. The chlorotrifluoroethylene-type polymer for instance, is little effected by prolonged exposure at moderate temperatures to halogens, to concentrated sulfuric acid, hydrofluoric and hydrochloric acids, to strong caustic, to fuming nitric acid, to aqua regia and to other vigorous oxidizing agents. Few solvents completely dissolve the high polymer below its transition temperature (near 218° C.). The highest polymers are useful in some cases over the astonishing temperature range of minus 100° C. to plus 200° C. at which they neither become brittle nor melt.

The fact that tetrafluoroethylene, chlorotrifluoroethylene, and the like, when polymerized, are stiffer, more chemically resistant and have higher melting points than their polymerized hydrocarbon analogs appears attributable to their being highly fluoro-substituted, respectively. These distinct properties are attributed to the higher energy of the C—F bond as compared to the C—H bond and to the bulkier nature of the fluorinated compound. For example, highly fluoro-substituted hydrocarbons generally have 50 to 60 percent higher molar volumes than the corresponding parent hydrocarbons.

The art, in an attempt to partially overcome the stiffness and high melting point characteristics of these fluoro-substituted polymers, has replaced some of the fluorine with less bulky hydrogen or has broken up the regularity of recurring —$CF_x$ groups through branching or the use of other substituents. These other substituents very often are introduced by copolymerizing a highly-fluorinated monomer with butadiene, styrene, acrylonitrile, and the like, as suggested hereinabove.

Copolymerization of fluorinated monomers with other than fluorine-substituted monomers is generally effected such that the resulting copolymer contains at least 4 mol percent of the fluorinated monomer polymerized therein. Of course, the percentage may go up to 100 mol percent, at which point the polymer is not a copolymer but a homopolymer.

Still another group of fluorochemicals contemplated herein in which the —$CF_x$ group does not appear with such high regularity upon polymerization may be characterized by the formula $$R_fCH_2—O—CO—CH=CH_2$$

where $R_f$ is a perfluorinated aliphatic residue or nearly-completely fluorinated grouping of up to 8 carbons. Typical of these acrylates of fluorinated alcohols are $$CF_3(CF_2)_2—CH_2—O—CO—CH=CH_2$$
$$CF_2H(CF_2)_2—CH_2—O—CO—CH=CH_2$$

and the like.

Another type of fluorochemical polymer contemplated herein is based on the acrylates of fluorinated ether alcohols. Among these are the following:

$$CF_3—O—CF_2—CH_2—O—CO—CH=CH_2$$
$$CF_3—CF_2—O—CF_2—CF_2—CH_2—O—CO—CH=CH_2$$
$$CF_3(CF_2)_2—O—CF_2—CF_2—CH_2—O—CO—CH=CH_2$$
$$CF_3—CH_2—O—CH_2—CH_2—O—CO—CH=CH_2$$
$$CF_2H—CF_2—O—CH_2—CH_2—O—CO—CH=CH_2$$
$$CF_2H—CF_2—(O—CH_2—CH_2)_2—O—CO—CH=CH_2$$

Polymers from the hereinabove disclosed acrylates from fluorinated alcohols may be prepared by conventional emulsion polymerization methods and subsequently vulcanized in making a rubber or elastomer. A typical recipe is:

TABLE I

| | Parts by weight [1] |
|---|---|
| Fluorochemical polymer (acrylate from fluorinated alcohol) | 100.00 |
| Filler | 35.00 |
| Triethylene tetramine | 1.00 |
| Sulfur | 1.25 |

[1] Parts by weight per 100 parts by weight of fluorochemical polymer.

As will be seen hereinafter, silicone oil in the presence of the finely-divided siliceous filler contemplated herein may be introduced into the above recipe in order to realize the enhanced physical properties afforded by the present invention.

Also typical of the fluorochemical compositions contemplated herein are those prepared by copolymerizing tetrafluoroethylene and tetrafluoropropylene, chlorotrifluoroethylene and vinylidene fluoride, and the like.

Copolymers of chlorotrifluoroethylene with vinylidene fluoride may be made up by copolymerizing monomeric mixtures containing 50 mol percent of $CH_2=CF_2$ and 50 mol percent of $CF_2=CFCl$. A slightly higher mol percent of $CH_2=CF_2$ and a correspondingly lower mol percent of $CF_2=CFCl$ may be used, such as 70 mol percent of the former monomer in admixture with 30 mol percent of the latter monomer. The resulting copolymers may be vulcanized, as contemplated herein, using a conventional vulcanizing agent, such as benzoyl peroxide. A typical recipe is:

TABLE II

| | Parts by weight [1] |
|---|---|
| Fluorochemical polymer (e.g., fluorocarbon copolymer of $CF_2=CFCl$ and $CH_2=CF_2$) | 100.00 |
| Filler | 10.00 |
| Dyphos (dibasic lead phosphite) | 10.00 |
| Benzoyl peroxide | 3.00 |

[1] Parts by weight per 100 parts by weight of fluorochemical polymer.

Not the least among the fluorochemicals contemplated herein are those prepared by emulsion polymerization of equimolar proportions of perfluoropropylene and vinylidene fluoride, the polymer being characterized by the following recurrent groups:

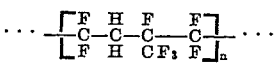

According to the present invention, 0.5 to 25 parts by weight of silicone oil and 5 to 100 parts by weight of siliceous pigment per 100 parts by weight of the fluorochemical polymer may be employed.

The following example illustrates the results obtainable by incorporating a silicone oil into a particular fluorochemical polymer using a finely-divided siliceous pigment of the type contemplated herein:

Example I

Fifty-five pounds of a finely-divided, hydrated silica having a surface area of 148 square meters per gram, an average ultimate particle size of 0.022 micron and containing at least 90 percent $SiO_2$ on an anhydrous basis was put into a Sprout-Waldron ribbon mixer having a capacity of 6 cubic feet and a ribbon speed of 45 revolutions per minute. Through a jet made from a pipette tip 2082.5 grams of dimethyl silicone oil was pumped into the mixer at a rate such that about an hour was required to feed all of the oil to the mixer at a substantially constant rate. The oil and silica were admixed in the mixer for a period of 20 hours, at which time product mixture was removed therefrom and fed into a 1-foot by 8-foot stainless steel steam tube rotary drier which was sealed to effect a batch-wise heat treatment. The drier was loaded approximately full and the steam temperature adjusted so that the drier temperature was approximately 180° C. The drier was rotated slowly for one hour after which the charge was removed. The silicone oil added yielded an 8.34 percent by weight coating on the silica.

Subsequently, the oil-treated silica was incorporated into a copolymer of chlorotrifluoroethylene and butadiene as shown in recipe B of the following table:

TABLE III

| | A | B |
|---|---|---|
| Fluorocarbon copolymer of Example I above | 100.00 | 100.00 |
| Zinc oxide | 5.00 | 5.00 |
| Benzoyl peroxide | 1.50 | 1.50 |
| Silica of Example I above without silicone oil treatment | 20.00 | |
| Silicone oil-treated silica of Example I above | | 20.00 |

The values given in Table III above are in parts by weight of the fluorocarbon copolymer.

Recipes A and B of Table III above were milled and cured according to conventional practice, in this case 16 minutes at 230° F. plus 48 hours' oven cure at 250° F. Standard physical tests of the thus-cured samples showed the following characteristics:

TABLE IV

| | A | B |
|---|---|---|
| Tensile strength in pounds per square inch | 1,550 | 3,900 |
| Modulus at 300 percent elongation | 1,250 | 2,150 |
| Elongation (percent) | 510 | 440 |
| Shore A Hardness | 76 | 69 |
| Tensile after 144 hours in red fuming Nitric Acid | 100 | 550 |
| Elongation after 144 hours in R.F.N.A. | 1,300 | 900 |
| Hardness after 144 hours in R.F.N.A. | 30 | 43 |

These results show quite conclusively that the present invention affords fluorocarbon elastomers having substantially better than twice the tensile strength of fluorocarbon elastomers having no silicone oil therein. Furthermore, a substantial improvement in hardness or a substantial decrease in hardness can be witnessed.

These features are all the more significant when one considers that the art could not, prior to the instant discovery, introduce plasticizers in fluorochemical compositions without their bleeding out.

According to a still further example, substantial similar improvements may be achieved:

Example II

Finely-divided silica of the type disclosed in Example I above is similarly treated with the identical silicone oil such that a silica product results containing about 20 percent by weight of silicone oil. Thus-treated silica is introduced into a fluorocarbon copolmer resulting from the emulsion polymerization of perfluoropropylene and vinylidene fluoride, the polymer having a molecular weight of about 60,000 and containing the following recurring groups:

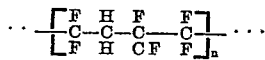

Milling and curing are effected as in Example I above only the following recipe is used, the amounts therein being given in parts by weight per 100 parts by weight of the copolymer.

TABLE V

| | Amount |
|---|---|
| Fluorocarbon copolymer of Example II | 100.00 |
| Zinc oxide | 5.00 |
| Silica treated with silicone oil (20 percent oil by weight) | 20.00 |
| Dyphos (dibasic lead phosphite) | 5.00 |
| Benzoyl peroxide | 2.00 |

The fluorocarbon rubber produced from Table V above has very substantially enhanced tensile strength and greatly decreased hardness.

The fluorochemical compositions produced as described herein may be compounded into sheets, tubes, rods, laboratory ware and foil, for instance, and may be utilized wherever great stability against chemical attack is desired and wherever a composition which is stable at a wide variety of temperatures is needed. Thus, the tubing made therefrom is highly serviceable in a refrigeration unit.

Although the present invention has been described with reference to the specific details of certain embodiments, it is not intended that such embodiments shall be regarded as limitations upon the scope of the invention, except insofar as the limitations are included in the accompanying claims.

The present application is a continuation-in-part of U.S. application Serial No. 404,239 of Welch et al., filed March 14, 1955, now abandoned.

We claim:

1. The method which comprises admixing a silicone-coated, finely-divided hydrated silica having a surface area of 25 to 300 square meters per gram and an average ultimate particle size below 0.1 micron with a solid linear polymer and milling said mixture, said silicone having the general formula.

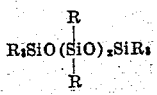

where R is a member selected from the group consisting of aliphatic, cycloaliphatic and aryl hydrocarbon radicals, the ratio of R:Si is approximately 2 and $x$ is a number from 1 to 10,000, and said solid linear polymer is a polymer of a polymerizable ethylenic compound containing at least one fluorine atom directly attached to a carbon atom.

2. The method of claim 1 wherein the amount of said finely-divided hydrated silica comprises 5 to 100 parts by weight per 100 parts by weight of said solid linear polymer and the amount of said silicone comprises 0.5 to 25 parts by weight per 100 parts of said solid linear polymer.

References Cited in the file of this patent

UNITED STATES PATENTS

| | | |
|---|---|---|
| 2,644,802 | Lontz | July 7, 1953 |
| 2,665,264 | Brooks et al. | Jan. 5, 1954 |
| 2,668,789 | Phreaner | Feb. 9, 1954 |
| 2,710,290 | Safford et al. | June 7, 1955 |

OTHER REFERENCES

Machel et al.: Ind & Eng. Chem., volume 40, December 1948, pages 2285–2289.

UNITED STATES PATENT OFFICE
CERTIFICATION OF CORRECTION

Patent No. 2,940,947 June 14, 1960

Thomas H. Welch et al.

It is hereby certified that error appears in the above numbered patent requiring correction and that the said Letters Patent should read as corrected below.

Column 1, line 54, for "precipitaion" read -- precipitation --; column 2, lines 50 and 51, for "subsituated" read -- substituted --; column 6, line 31, for "copolmer" read -- copolymer --; line 69, for "404,239" read -- 494,239 --.

Signed and sealed this 2nd day of May 1961.

(SEAL)
Attest:

ERNEST W. SWIDER
Attesting Officer

DAVID L. LADD
Commissioner of Patents